Aug. 1, 1961 F. STERN-MONTAGNY 2,994,854

TRANSFER CIRCUIT

Filed June 23, 1954

INVENTOR.
FRANCIS STERN-MONTAGNY

BY Ralph L. Thomas

ATTORNEY 2,994,854
Patented Aug. 1, 1961

2,994,854

TRANSFER CIRCUIT

Francis Stern-Montagny, Poughkeepsie, N.Y., assignor to International Business Machines Corporation, New York, N.Y., a corporation of New York Filed June 23, 1954, Ser. No. 438,657
9 Claims. (Cl. 340—174)

The present invention relates in general to magnetic circuits capable of representing binary information by the remanent magnetic states of magnetic elements and more particularly to a transfer circuit for systems of the type embracing magnetic shift registers.

Shift registers and magnetic systems employing bi-stable magnetic elements in the form of toroids facilitate the representation of binary information in electronic digital computing systems. Prior forms of systems for representing binary information employed two position relays which, as the art advanced, were replaced by the bi-stable electronic trigger circuits, more commonly referred to as flip-flop circuits. Magnetic systems employing bi-stable magnetic elements have, in many circuit applications, replaced the flip-flop circuits for various reasons, the foremost of which are fewer failures of circuit components, less power dissipation, a smaller physical unit, and the retention of binary information in the event of power failure.

The magnetic cores employed in the present invention each have three windings thereon termed shift winding, input winding and output winding. The cores, magnetizable to either of two stable states, have remanent flux in the clockwise or counterclockwise direction within the core. Ordinarily, the value of remanent flux in either direction, referred to as retentivity, substantially is the same. The remanent flux is established in one direction to represent a binary one and in the opposite direction to represent a binary zero. For the purposes of the present invention, a current pulse applied to a shift winding changes the core from the "one" state to the "zero" state; whereas a read-in current pulse on the input winding, when sufficient in magnitude, changes a core from the zero state to the one state. The magnetic state of a core is transferred to the succeeding core by a transfer circuit which is energized when a core changes its magnetic state in response to a read-out or shift pulse.

Accordingly, an object of the present invention is to provide an improved system of the type employing binary magnetic elements.

Another object of the present invention is to provide an improved transfer circuit in a magnetic core system.

A still further object of the invention is to increase the reliability, reduce interference from ringing, and improve the lifetime of circuit components used in magnetic systems.

Other objects of the invention are pointed out in the following description and claims and illustrated in the accompanying drawings, which disclose, by way of example, the principle of the invention and the best mode, which has been contemplated of applying that principle.

Figure 1:
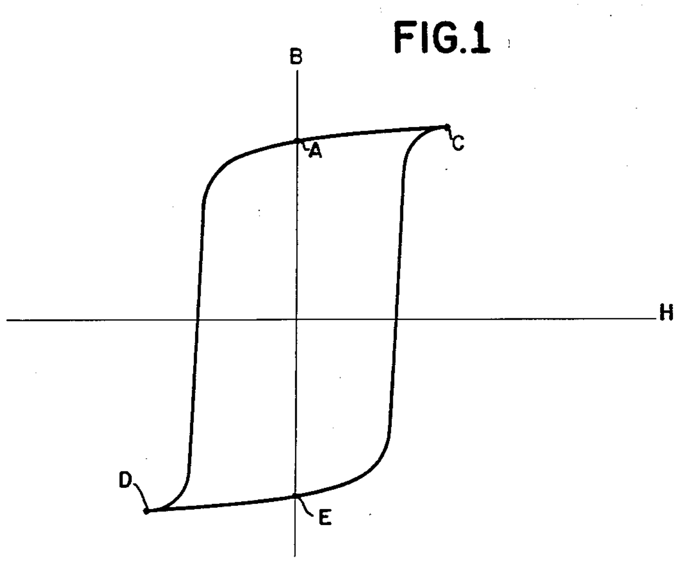
FIG. 1 is a curve illustrating a preferred hysteresis loop of the magnetic cores involved.

The curve in FIG. 1 illustrates an idealized hysteresis loop for commercially obtainable magnetic material. Points A and E are stable remanence states readily adapted for representing binary information, and a core may be driven to either of these states by the application of a positive or negative magnetomotive force, respectively.

If the state of remanence of a core of such material is that indicated by the point A, application of a positive magnetomotive force causes it to traverse the hysteresis curve to point C and, upon relaxation of this positive force, revert to point A. Application of a negative magnetomotive force greater than the coercive force causes the curve to be traversed to point D and, when the force is terminated, traversed to point E. Similarly, with the remanence state of the core standing at point E the application of a negative magnetomotive force causes the curve to be traversed to point D and return to point E when the negative force is relaxed; while a positive force greater than the coercive force causes a traversal of the curve from point E to point C and return to point A when the positive force is terminated.

With the state of remanence indicated at point A arbitrarily selected as representing a binary one and the state of remanence indicated at point E as a binary zero, application of a negative magnetomotive force by pulsing a shift winding on a core simultaneously causes a voltage to be induced in an output sense winding if the core was previously in the one state; while a negligible voltage is induced in the output winding if the core was in the zero state.

Figure 2:
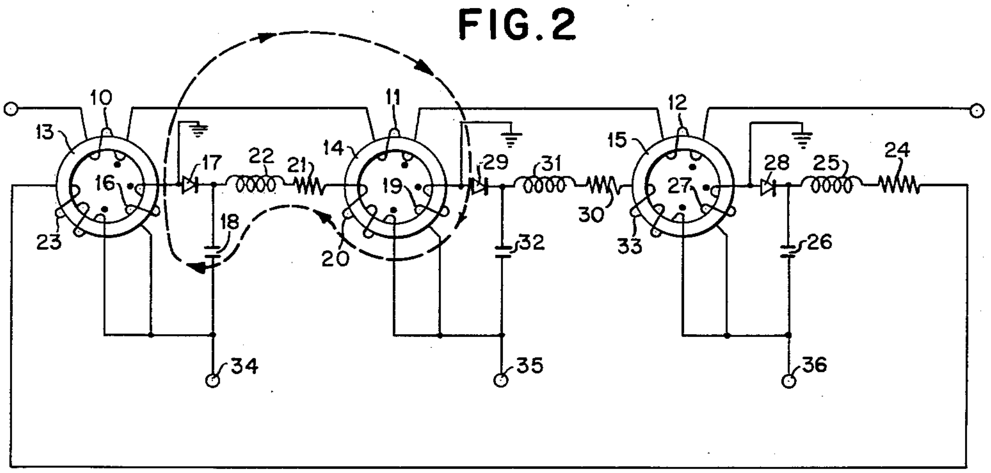
FIG. 2 is an illustration of a magnetic core system embodying the novel transfer circuit of the present invention.

Reference is made to FIGURE 2 for a description of the magnetic core shift register embodying the novel transfer circuit of the present invention. A shift pulse applied to windings 10 through 12 establishes a negative magnetomotive force on cores 13 through 15, and any core in the one state of remanence, represented by point A on the curve in FIG. 1, is changed to the zero state of remanence indicated by point E in FIGURE 1. If the core 13 is in the one state when a negative magnetomotive force is applied, a voltage is induced on the winding 16 which establishes current flow through a diode 17 to charge a condenser 18. The shift pulse terminates very rapidly, and the condenser 18 discharges through the winding 16 to ground, then through winding 19, winding 20, resistor 21 and coil 22, to the opposite side of condenser 18 along the path indicated by the dotted line. The positive magnetomotive force established on the core 14 by the discharge current through windings 19 and 20 serves to change the magnetic state of core 14 from that state indicated at point E on the curve in FIGURE 1 to that state indicated at point A. Thus, the binary one stored in core 13 is transferred to core 14 in response to the first shift pulse, and the binary one is shifted to the succeeding cores in a like fashion upon receipt of successive shift pulses. The reliability of the transfer circuit is improved as a result of the discharge current flowing through both windings 19 and 20 since they are connected in aiding relation to write a one in core 14. The reliability of the transfer circuit is further enhanced since the discharge current flows in a direction through winding 16 to maintain core 13 in the zero state.

The condenser 18 is charged during the small interval of time that the shift pulse is applied since diode 17 offers very little impedance to the charging current established by the winding 16 as the core 13 undergoes a reversal of magnetic flux direction. A voltage induced in the windings 16 and 23 during the brief interval that a shift pulse is applied tends to establish current flow through resistor 24, coil 25, condenser 26 and winding 27 to ground. The effect is to tend to charge condenser 26. However, resistor 24 and coil 25 offer a high impedance to instantaneous currents, and very little charge, if any, is built-up on condenser 26. In the event, however, that a slight charge is built-up on condenser 26 during the brief interval of the shift pulse, its discharge is primarily through winding 27 and diode 28; also a smaller discharge current is in a direction through windings 23 and 16 to aid the discharge current from condenser 18.

The number of turns employed on either winding 19 or 20 may be any number desired. Where windings 19 and 20 have an equal number of turns, a center-tapped winding is conveniently employed. It is desirable, however, to reduce the number of turns on winding 19 and increase the number of turns on winding 20. Condenser 18 then receives a smaller charge when a shift pulse is applied, and a smaller discharge current flows as a consequence. The transferred input magnetomotive force, being a direct function of the ampere turns, remains substantially the same on core 14 because of the increased number of turns on winding 20. Because of the smaller induced voltage applied across diode 17 and condenser 18, these elements have a longer, useful life. Furthermore, the reduced number of turns on winding 16 apparently reduces the tendency of the transfer circuit to ring, thereby minimizing electrical interferences.

Arranged as shown, diodes 28, 29, resistors 24 and 30, inductances 25, 31, condensers 26 and 32, and coils 33 and 23 serve in respective transfer circuits which perform in the same fashion as the transfer circuit explained above. Thus it is seen that the cores 13 through 15 are connected in tandem by respective transfer circuits.

If one of the cores is in the one state of magnetization when a shift pulse is applied, the succeeding magnetic core is changed to the one state by the transfer circuit connected therebetween. As succeeding shift pulses are applied, the one state of magnetization is shifted one core in response to each shift pulse. Since the shifting is cyclic in response to shift pulses, the shifting register of FIGURE 2 may be used as a count down circuit by taking an output from any one of the terminals 34 through 36. In the arrangement shown, three input shift pulses yield one output pulse. It is understood that the number of cores employed in a shift register may be varied as desired.

While there are shown and described and pointed out the fundamental novel features of the invention as applied to a particular embodiment, it is understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic shift register including a plurality of bi-stable magnetic elements, a first, second and third winding on each bi-stable magnetic element, said first winding being responsive to an actuating signal to change the magnetic state of its bi-stable magnetic element from one stable state to another stable state, a transfer circuit for transferring the stable state of one bi-stable magnetic element to another bi-stable magnetic element in response to said actuating signal, said transfer circuit interconnecting said second winding on one bi-stable magnetic element with said second and third windings on another bi-stable magnetic element, said second winding serving both input and output functions for the associated core.

2. A magnetic shift register including a plurality of bi-stable magnetic cores, each magnetic core having a first, second and third winding thereon, said first winding serving to change the magnetic state of its core in response to an actuating signal, a transfer circuit for each of said cores serving to transfer the magnetic state of one core to another core, said transfer circuit coupling the second winding of one core to the second and third windings of another core, said transfer circuit including means to provide a time delay between said actuating signal and the transfer of the magnetic state of one core to another core, said second winding serving both input and output functions for the associated core.

3. The combination of claim 2 wherein said means to provide a time delay includes a condenser connected in series with a diode across said second winding.

4. The combination of claim 3 wherein a center-tapped winding constitutes said second and third windings.

5. The combination of claim 3 wherein said second winding has fewer turns than said third winding.

6. A magnetic core shifting register comprising a first bi-stable magnetic core and a second bi-stable magnetic core, said first magnetic core having a first winding and said second magnetic core having a first and a second winding, a first capacitor and a second capacitor, a charging circuit for said first capacitor including said first winding of said first magnetic core, a charging circuit for said second capacitor including said first winding of said second magnetic core, and a discharge circuit for said first capacitor including said first winding of said first core and said first and said second windings of said second core.

7. The apparatus of claim 6 wherein said charging circuits each include a unilateral conducting device, said unilateral conducting device and associated capacitor being connected serially across the associated first winding of each of said charging circuits.

8. A magnetic shift register including at least first and second bi-stable magnetic elements each having an output winding, said second magnetic element having an input winding, a signal storage device having an input circuit and an output circuit, said input circuit including said output winding of said first magnetic element, said output circuit including said output winding of said first magnetic element and both said input and output windings of said second magnetic element, whereby said output winding of said first magnetic element serves as part of said input circuit of said signal storage device and as part of said output circuit of said signal storage device.

9. A magnetic shift register including at least first, second and third bi-stable magnetic cores each having an input winding and an output winding serially connected, a signal storage device for each magnetic core, a unidirectional current conduction means for each signal storage device, said unidirectional current conduction means and associated signal storage device being connected serially across the associated output winding, said output winding of each magnetic core being connected to a common reference potential, said input winding of each core being connected to the signal storage device associated with the output winding of the preceding magnetic core, whereby said output winding of each core serves as part of the circuit which passes a signal to said signal storage device and further serves as part of the circuit which passes a signal from the signal storage device.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |
| 2,683,819 | Rey | July 13, 1954 |
| 2,781,503 | Saunders | Feb. 12, 1957 |

OTHER REFERENCES

Publication, IRE National Convention Record, Part 7, March 23, 1953, pp. 38–42.